United States Patent
Uchiyama et al.

(10) Patent No.: US 6,543,802 B1
(45) Date of Patent: Apr. 8, 2003

(54) AIR BAG APPARATUS

(75) Inventors: Atsuyuki Uchiyama, Tokyo (JP); Ichizo Kobayashi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/710,195

(22) Filed: Nov. 13, 2000

Related U.S. Application Data

(60) Provisional application No. 60/171,602, filed on Dec. 23, 1999.

(30) Foreign Application Priority Data

| Nov. 18, 1999 | (JP) | 11-328516 |
| Apr. 4, 2000 | (JP) | 2000-102408 |
| Oct. 26, 2000 | (JP) | 2000-327309 |

(51) Int. Cl.⁷ ............................................. B60R 21/20
(52) U.S. Cl. ................... 280/728.2; 280/732; 280/743.1
(58) Field of Search ........................ 280/732, 728.2, 280/728.3, 743.1

(56) References Cited

U.S. PATENT DOCUMENTS

| 5,072,967 A | * | 12/1991 | Batchelder et al. | 280/732 |
| 5,364,123 A | * | 11/1994 | Abramczyk et al. | 280/728.1 |
| 5,398,958 A | * | 3/1995 | Taggart | 280/728.2 |
| 5,460,402 A | * | 10/1995 | Rhodes, Jr. | 280/728.3 |
| 5,472,228 A | * | 12/1995 | Bentley et al. | 280/728.3 |
| 5,533,746 A | * | 7/1996 | Whited | 280/728.2 |
| 5,542,698 A | * | 8/1996 | Ichino et al. | 280/732 |
| 5,738,366 A | * | 4/1998 | Phillion | 280/728.2 |
| 5,848,803 A | * | 12/1998 | Tonooka et al. | 280/740 |
| 5,887,891 A | * | 3/1999 | Taguchi et al. | 280/728.2 |
| 6,170,857 B1 | * | 1/2001 | Okada et al. | 280/728.1 |
| 6,203,056 B1 | * | 3/2001 | Labrie et al. | 280/728.3 |
| 6,325,415 B1 | * | 12/2001 | Zelinski et al. | 280/743.2 |

FOREIGN PATENT DOCUMENTS

| JP | 07-117609 | | 5/1995 |
| JP | 08-310326 | | 11/1996 |
| JP | 10-157544 | | 6/1998 |
| JP | 2001030863 | * | 2/2001 |

* cited by examiner

Primary Examiner—Paul N. Dickson
Assistant Examiner—Deanna Draper
(74) Attorney, Agent, or Firm—Foley & Lardner

(57) ABSTRACT

A lightweight air bag apparatus which facilitates the positioning between an instrument panel and a lid, and to provide an air bag apparatus in which the lid is not attached to a retainer in substance. The air bag apparatus includes a retainer, an air bag which is folded and stored in the retainer, a lid which covers the open surface of the retainer, and an inflator (gas generator) for expanding the air bag. The external surfaces of the retainer are surrounded by belts, and both ends of the belts are fixed to the leg portions and with rivets, bolts, or other fittings. The peripheral portion around an opening formed in the instrument panel is clamped between the edge portion of the lid and the extending portions. The belts are not connected to the retainer.

25 Claims, 17 Drawing Sheets

AIR BAG APPARATUS

CROSS-REFERENCE TO RELATED APPLICATIONS

This application claims the benefit of and priority to the following applications:

U.S. Provisional Patent Application Ser. No. 60/171,602, filed Dec. 23, 1999;

Japanese Patent Application H11-328516, filed Nov. 18, 1999;

Japanese Patent Application 2000-102408, filed Apr. 4, 2000; and

Japanese Patent Application 2000-327309, filed Oct. 26, 2000.

Each of the above-referenced patent applications is incorporated by reference herein.

BACKGROUND OF THE INVENTION

The present invention relates to air bag devices mounted in vehicles, and more particularly relates to an air bag apparatus suitable for a passenger seat.

In the air bag apparatus for the passenger seat, an air bag is stored in a container-type retainer, which is covered by a lid. The air bag apparatus is disposed in an instrument panel of a vehicle. When the vehicle collides, an inflator expels a gas, which inflates the air bag. The inflated air bag pushes and opens the lid into the interior of a vehicle cabin, and then expands into the interior of the vehicle cabin.

As for the air bag apparatus of this type, a construction is known in which the lid is connected to the retainer with a belt and is movable in a direction in which the air bag goes out from the instrument panel. In the descriptions hereof, the direction in which the air bag goes out from the instrument panel is referred to as the "vertical direction".

FIG. 3 is a sectional view of such a conventional-type air bag apparatus for the passenger seat. A retainer 20 contains an air bag 21 and an inflator 22 which is disposed under the air bag 21. The retainer 20 is open at the upper surface and is covered by a lid 23. The retainer 20 is provided with hooking members 24 at both sides. The hooking members 24 have hook portions 24a which are inserted into through holes 26 formed in leg portions 25 of the lid 23. The hooking members 24 provided at both sides of the retainer 20 are connected to each other with a belt 30, which is attached to the retainer 20 at the bottom thereof with a rivet 31. The leg portions 25 are provided with attachments 27 at the external surfaces. The attachments 27 clamp an instrument panel 28 at the peripheral portion around an opening 29 formed for receiving the air bag apparatus. Accordingly, the lid 23 is fixed to the instrument panel 28.

According to the above-described air bag apparatus of the conventional type shown in FIG. 3, the belt 30 is attached to the retainer 20 with the rivet 31. Thus, the lid 23 attached to the instrument panel 28 may receive an opposing force from the belt 30, so that the peripheral portion around the opening 29 of the instrument panel 28 and the edge portion of the lid 23 constantly receive stress. In addition, the belt 30 may apply upward pressure to the lid 23 and lift the lid 23 by some amount corresponding to the clearance provided between the attachments 27 and the peripheral portion around the opening 29 of the instrument panel 28. In such a case, the lid 23 slightly protrudes relative to the instrument panel 28.

SUMMARY OF THE INVENTION

Accordingly, an object of the present invention is to provide an air bag apparatus which has a construction such that the lid is not supported by the retainer in practice.

An air bag apparatus of the present invention comprises a retainer having the shape of an open container, an air bag which is stored inside the retainer and of which a peripheral portion around an aperture for receiving a gas is attached to the retainer, a lid which covers the open surface of the retainer, and attaching means formed in an instrument panel for attaching the lid to an opening for receiving the lid, wherein one or more members are led around the external surfaces of the retainer, and are attached to the lid with both ends of the members, and wherein the members are not restrained by the retainer so that the lid is movable in the vertical, the longitudinal, and the widthwise directions.

As described above, the members are not restrained by the retainer, so that the lid does not receive the external force generated by elasticity of the members. Thus, the lid is completely free from the retainer while it is attached to the instrument panel by the attaching means. Accordingly, even when there is a positioning error between the retainer and the peripheral portion around the opening of the instrument panel, the lid may easily be fitted into the opening in the regular position.

The attaching member may be combined with the members, and may be formed as extending portions of the members which extend to the bottom surface of the peripheral portion around the opening for receiving the lid. Such a construction makes the lid simpler.

Alternatively, the lid may be provided with leg portions which are disposed along the external surfaces of a pair of walls of the retainer, and the attaching means may be formed as protrusions provided on the leg portions behind the peripheral portion around the opening for receiving the lid. According to such a construction, the members may simply be attached to the lid, so that the construction of the members becomes simpler.

Preferably, a predetermined amount of clearance is provided between the members and the retainer over the entire region of the external surfaces of the retainer. In such a construction, the members are not restrained by the retainer.

The members may be belts, elastic materials such as springs, etc. Various non-elastic materials may also be used as the members. Belts have simple construction, and they are inexpensive.

The belts may be attached to the lid by fixing members. By increasing the number of attachment points for attaching the fixing members, stress applied to the lid from the belts when the air bag apparatus is activated would be distributed.

The lid may be reinforced at parts where the belts are attached. Accordingly, even when the lid receives a large amount of force from the belts when the air bag apparatus is activated, the lid would be sufficiently resistant.

The belts may be provided with non-woven fabrics or sponges on the surface facing the retainer. Such a construction prevents unusual noise when the belts contact the retainer.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiment shown in the drawings, which are briefly described below.

DETAILED DESCRIPTION OF THE EMBODIMENTS

Figure 1A:
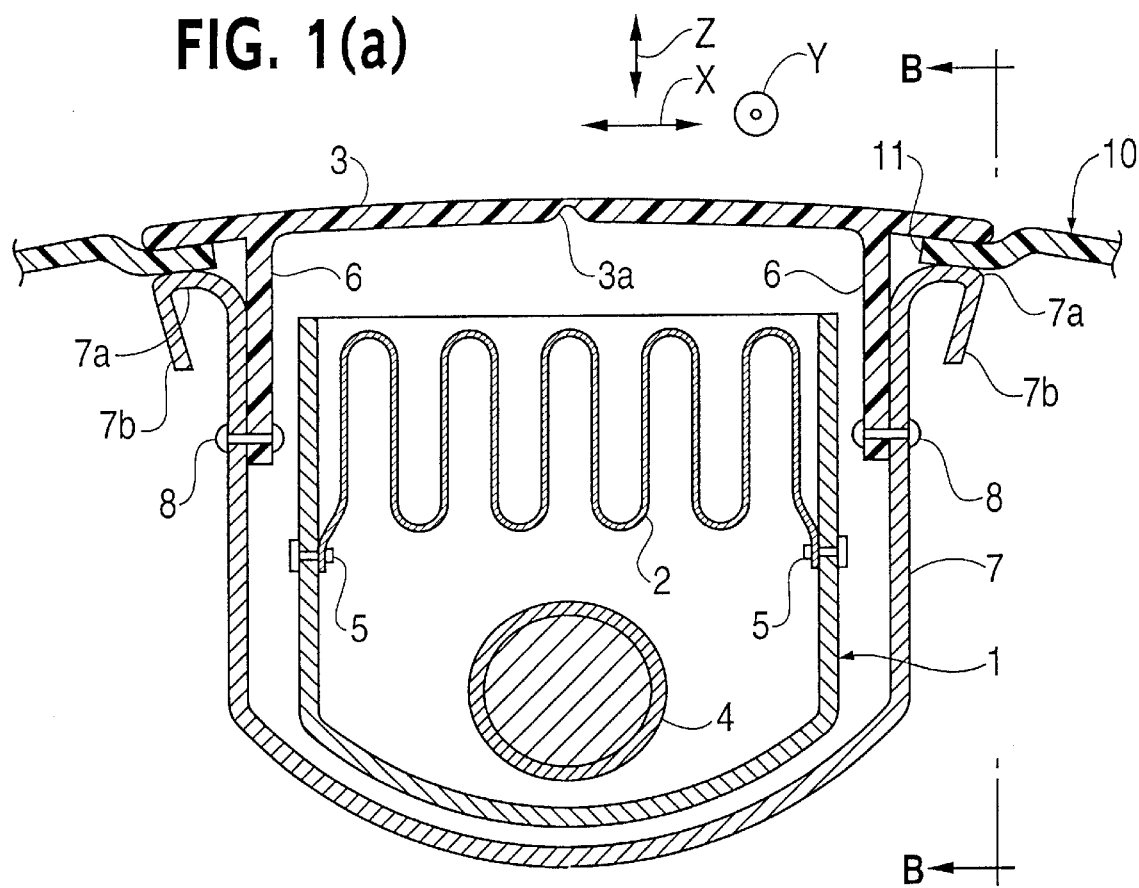
FIG. 1(a) is a sectional view of an air bag according to an embodiment of the present invention.

Embodiments of the present invention will be described below with reference to the accompanying drawings. The term "vertical direction" refers to a direction in which an air bag deploys out from an instrument panel 10, that is, the Z direction shown in FIG. 1. In addition, the term "longitudinal direction" refers to the longitudinal direction with regard to the vehicle loaded with the air bag apparatus, which is the x direction in FIG. 1, and "widthwise direction" refers to the widthwise direction of the vehicle, which is the Y direction in FIG. 1. These directions are defined for convenience and are not intended to be taken literally or to limit the present invention in any form.

The air bag apparatus includes a retainer 1 of which the upper surface (the front surface) is open. An air bag 2 is folded and stored in the retainer 1. Metal fittings 5 attach the air bag 2 to the retainer. A lid 3 covers the open surface of the retainer 1. An inflator (gas generator) 4 for expanding the air bag 2 is provided. According to the embodiment shown in FIGS. 1(a) and 1(b), the retainer 1 is longer in the widthwise direction of the vehicle than in the longitudinal direction of the vehicle. In addition, the retainer 1 has the shape of an open container. The open surface at the upper side has an approximately rectangular shape.

The lid 3 is provided with leg portions 6 which project from the bottom surface of the lid 3. The leg portions 6 are disposed along the external surfaces of the retainer 1 at the upper side, leaving a predetermined clearance therebetween. The leg portions 6 are elastic and may be bent in the X direction.

The external surfaces of the retainer 1 are surrounded by belts 7. Both ends of the belts 7 are fixed to the leg portions 6 with rivets 8, bolts, or other fittings.

The belts 7 are preferably constructed of, for example, strings or bands woven by plastic threads, metal belts such as flexible steel belts, fiber-reinforced plastic belts, rubber belts containing steel cords, etc. The belts 7 are not connected to the retainer 1, but do pass around the side surfaces and the bottom surface of the retainer 1. There is a clearance provided between the belts 7 and the retainer 1 over the entire region of the external surfaces of the retainer 1. The amount of the clearance is enough to allow the lid 3 to move, for positioning itself, in the Z and X directions without being restrained by the retainer 1.

Two or more belts 7 (e.g., three as shown in FIG. 1) are arranged in the widthwise direction (the Y direction) with gaps therebetween. Brackets 9 for attaching the retainer 1 to a member of the main body of the vehicle (not shown) are disposed between the belts 7.

The belts 7 are provided with extending portions 7a at both ends, which extend to the bottom surface of the instrument panel 10. The peripheral portion of the instrument panel 10 forming an opening 11 is resiliently clamped between the edge portion of the lid 3 and the extending portions 7a.

According to the present embodiment, end portions 7b of the extending portions 7a extend downward, as shown in the figure, in a direction away from the instrument panel. In addition, the end portions 7b are bent so that the lower sides are closer to the retainer 1. This construction allows the end portions 7b to slide against the peripheral portion of the panel 10 around the opening 11 during the process of attaching the lid 3 to the opening 11.

The lid 3 may also be provided with another pair of leg portions (not shown) on the bottom surface. These leg portions are arranged in the direction perpendicular to the leg portions 6, and are disposed along the edge portion of the retainer 1 in the X direction so that the retainer 1 is surrounded by leg portions.

When attaching the air bag apparatus to the instrument panel 10, the air bag apparatus is inserted into the opening 11 from the front side of the instrument panel 10. Then, the edge portion of the lid 3 and the extending portions 7a clamp the peripheral portion of the panel 10 around the opening 11. The retainer 1 is fixed to the member of the main body of the vehicle via the brackets 9. When the air bag apparatus is being inserted into the opening 11, the leg portions 6, extending portions 7a, and the end portions 7b are deformed and bent to more closely approach the retainer 1. After the extending portions 7a are passed through the opening 11, they elastically recover to the original forms so that the extending portions 7a and the edge portion of the lid 3 clamp the end portion surrounding the opening 11.

The lid 3 of the air bag apparatus is not required to be fixed to the retainer 1. Thus, the lid 3 is able to move in the vertical, the longitudinal, and the widthwise directions without being restrained by the retainer 1. Accordingly, even when there is some amount of positioning error between the air bag apparatus and the opening 11 of the instrument panel 10, the error may be compensated for and the lid 3 may easily be fitted into the opening 11 in the regular position.

In an emergency situation, for example, when the vehicle collides, the inflator 4 expels a gas which expands the air bag 2, the lid 3 breaks and opens along a tear line 3a, and the air bag 2 expands into the vehicle cabin.

Figure 1B:
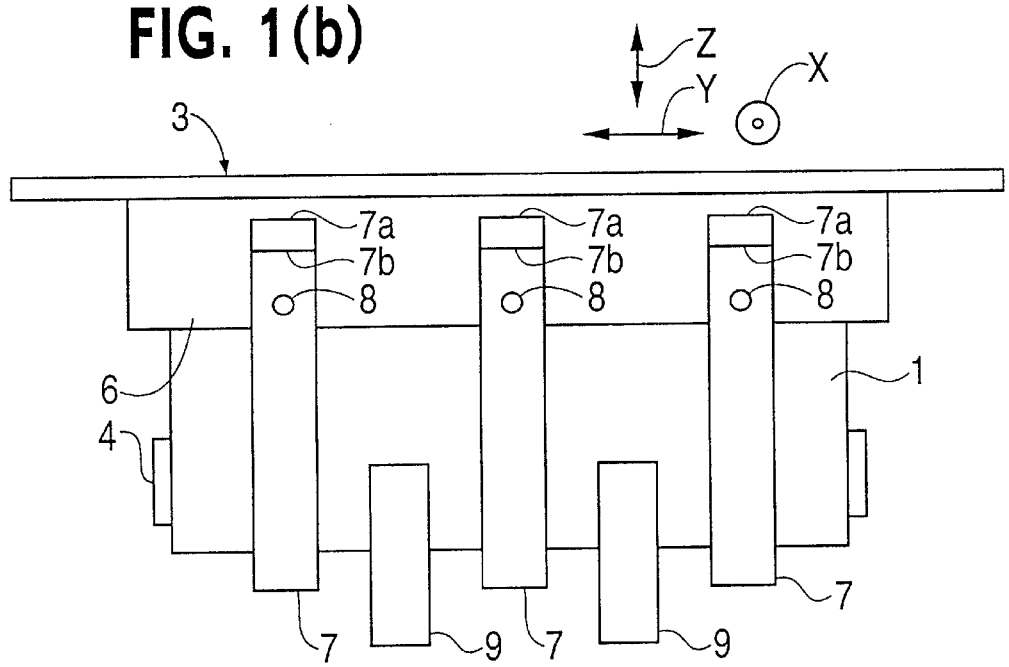
FIG. 1(b) is a side view of the air bag apparatus shown in FIG. 1(a) as seen from the direction shown by arrows B—B.
Figure 2:
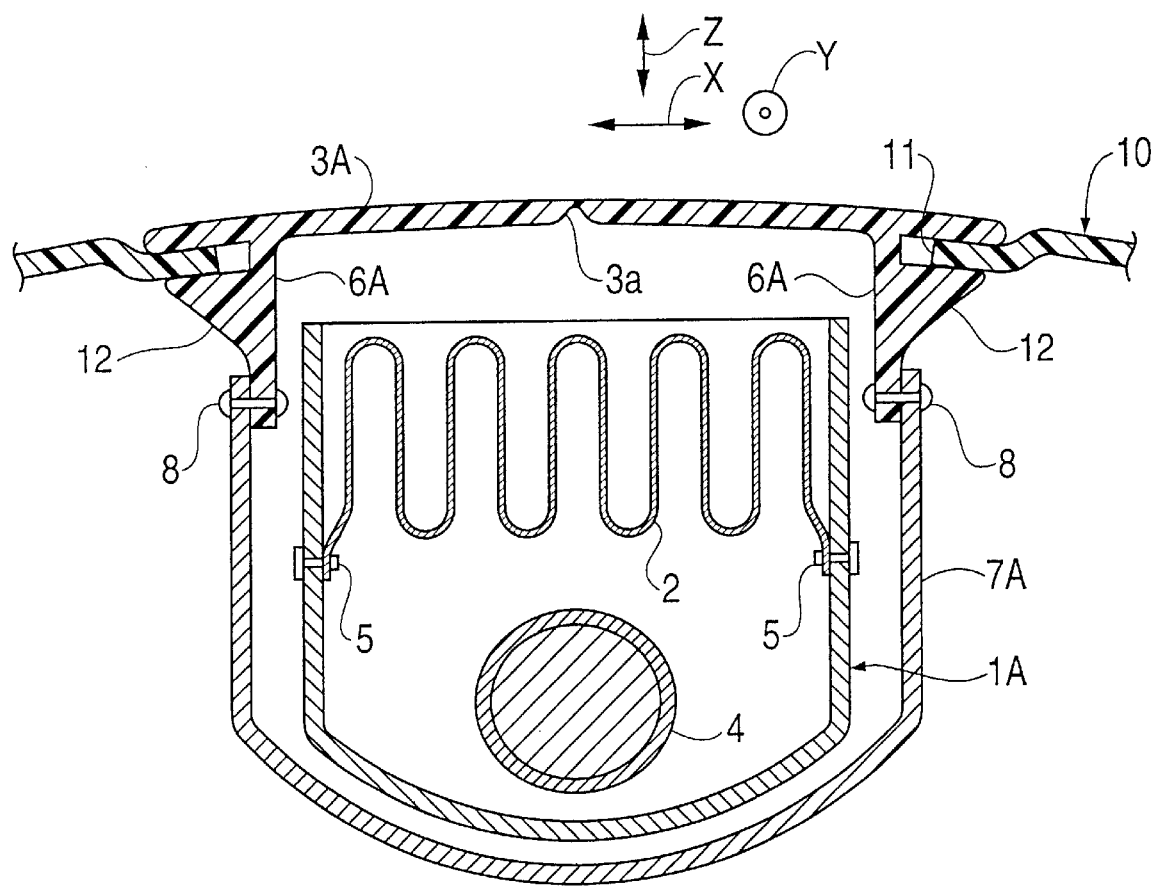
FIG. 2 is a sectional view of an air bag apparatus according to another embodiment of the present invention.
Figure 3:
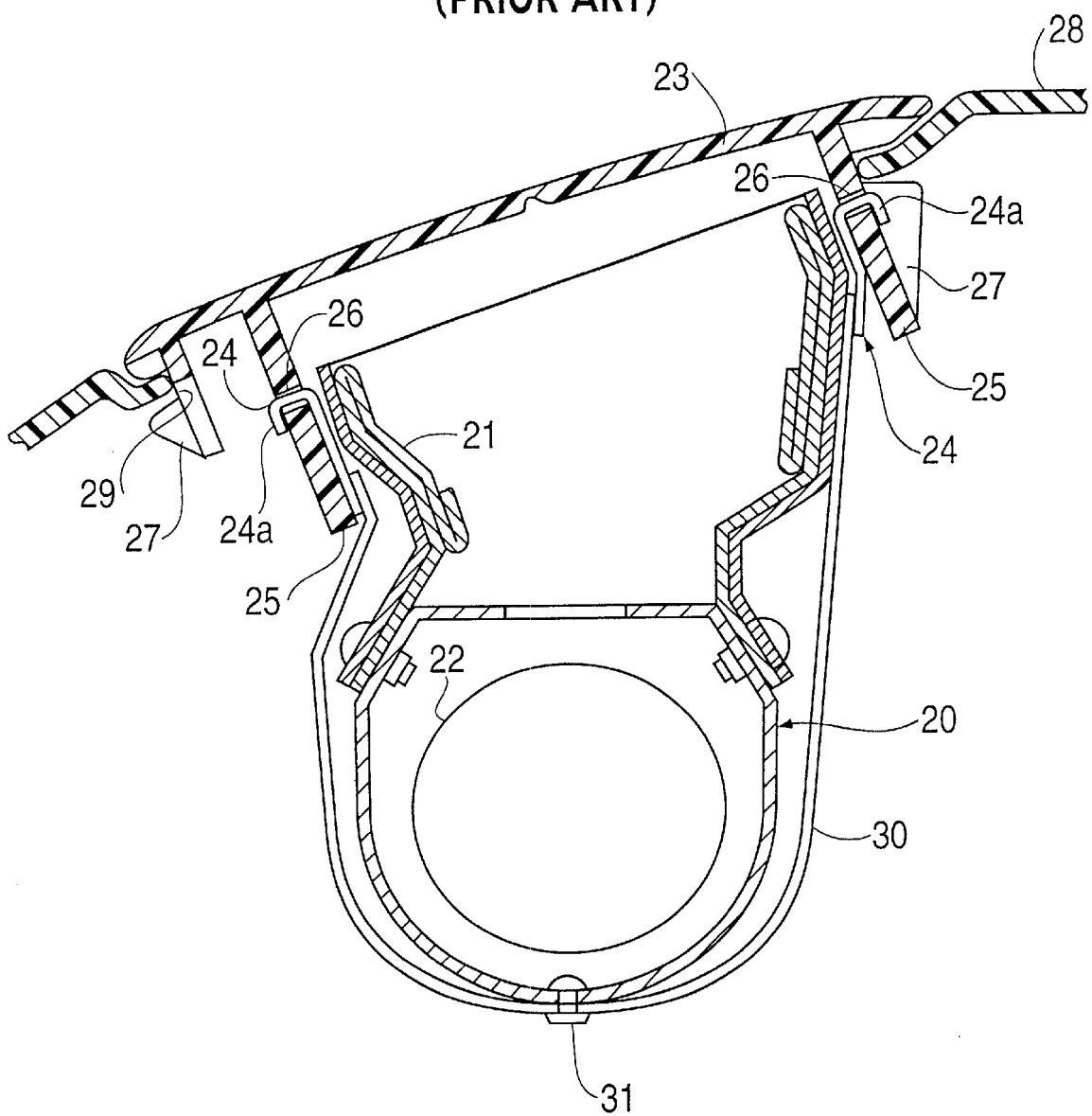
FIG. 3 is a sectional view of a conventional air bag apparatus.

FIG. 2 is a sectional view of an air bag according to another embodiment of the present invention, showing the same parts as FIG. 1(a). According to this embodiment, a lid 3A is provided with protrusions 12 at the external surfaces of the leg portions 6A. The protrusions 12 and the edge portion of the lid 3A clamp the peripheral portion of the panel 10 around the opening 11 of the instrument panel 10. The lower surfaces of the protrusions 12 form slopes which approach the retainer 1A towards the bottom. When the air bag apparatus having the lid 3A is being inserted into the opening 11 of the instrument panel 10 for installation in the vehicle, the slope of the protrusions serves to facilitate the installation. The bottom surfaces of the protrusions 12 slide against the peripheral portions around the opening 11, so that the protrusions 12 smoothly pass over the edge portion.

In this embodiment, belts 7A have the same shape as the above-described belts 7, except that the extending portions 7a and the end portions 7b are omitted. Both ends of the belts 7A overlap the external surfaces of the leg portions 6A, and are fixed by the rivets 8 to the lid 3. Similar to the belts 7, the belts 7A are also not restrained by the retainer 1A, and a predetermined clearance is provided between the belts 7A and the retainer 1A over the entire region of the external surfaces of the retainer 1A.

Other parts of the air bag apparatus shown in FIG. 2 have the same construction as the air bag apparatus shown in FIG. 1, wherein the same numbers indicate the same parts.

In the air bag apparatus shown in FIG. 2, the lid 3A is able to move in the vertical, the longitudinal, and the widthwise directions relative to the retainer 1A. Accordingly, even when there is a displacement between the air bag apparatus and the opening 11 of the instrument panel 10, the lid 3 may easily fit into the opening 11 in the regular position.

Figure 4:
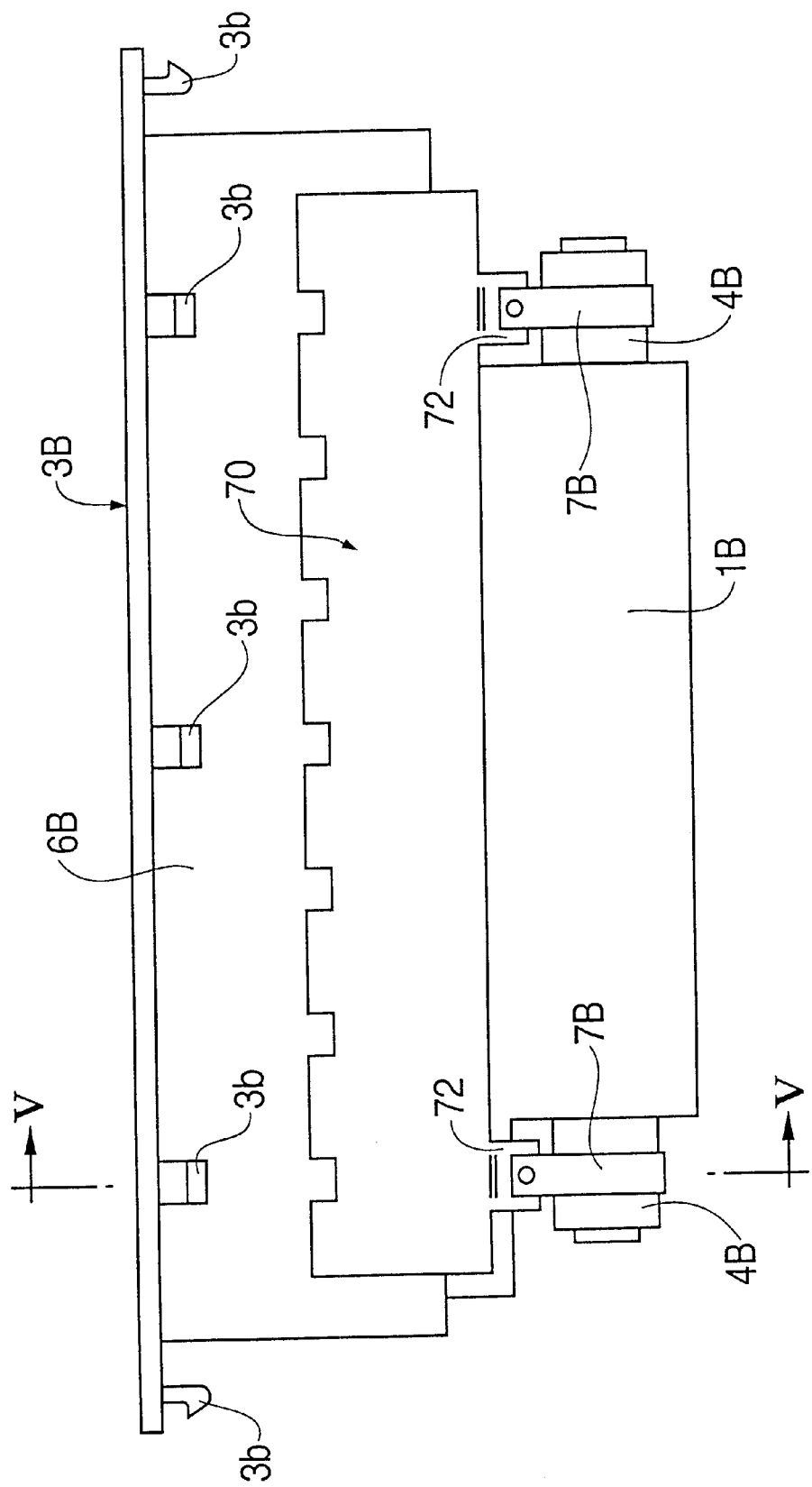
FIG. 4 is a side view of an air bag apparatus according to another embodiment of the present invention.
Figure 5:
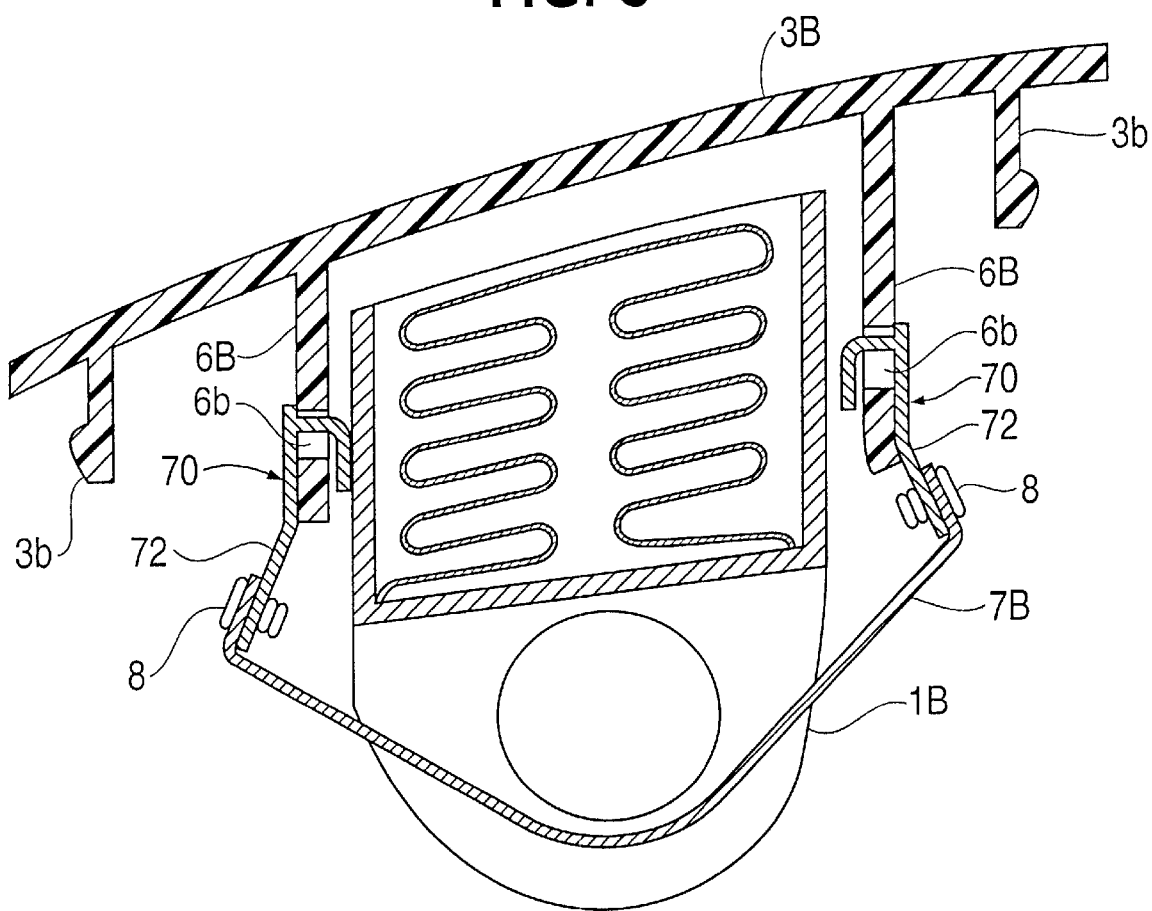
FIG. 5 is a sectional view of the air bag apparatus shown in FIG. 4, which is cut along line V—V.

A further embodiment of the present invention is shown in FIGS. 4 and 5. The air bag apparatus includes a retainer 1B of which the upper surface (the front surface) is opened. An air bag is folded and is stored in the retainer 1B. A lid 3B covers the open surface of the retainer 1B. An inflator (gas generator) 4B for expanding the air bag 2 is provided. Metal fittings are also included for attaching the air bag 2 to the retainer 1B. The retainer 1B is longer in the widthwise direction of the vehicle than it is in the longitudinal direction of the vehicle. In addition, the retainer 1B has the shape of an open container. The open surface at the upper side has an approximately rectangular shape.

As shown in FIG. 5, the lower section of the retainer 1B is shorter in the widthwise direction of the vehicle than the upper section, and both ends of the inflator 4B protrude from the side surfaces of the retainer 1B.

The lid 3B is provided with leg portions 6B which project from the bottom surface of the lid 3B. The leg portions 6B are positioned along the external surfaces of the retainer 1B at the upper side, leaving a predetermined clearance therebetween. The lid 3B is also provided with projections 3b which project from the bottom surface of the lid 3B and which engage with the instrument panel.

The external surfaces of the retainer 1B are surrounded by belts 7B. Both ends of the belts 7B are fixed to fixing members 70, which are attached to the leg portions 6B and 6B, by rivets 8, bolts, or other fittings.

Figure 6:
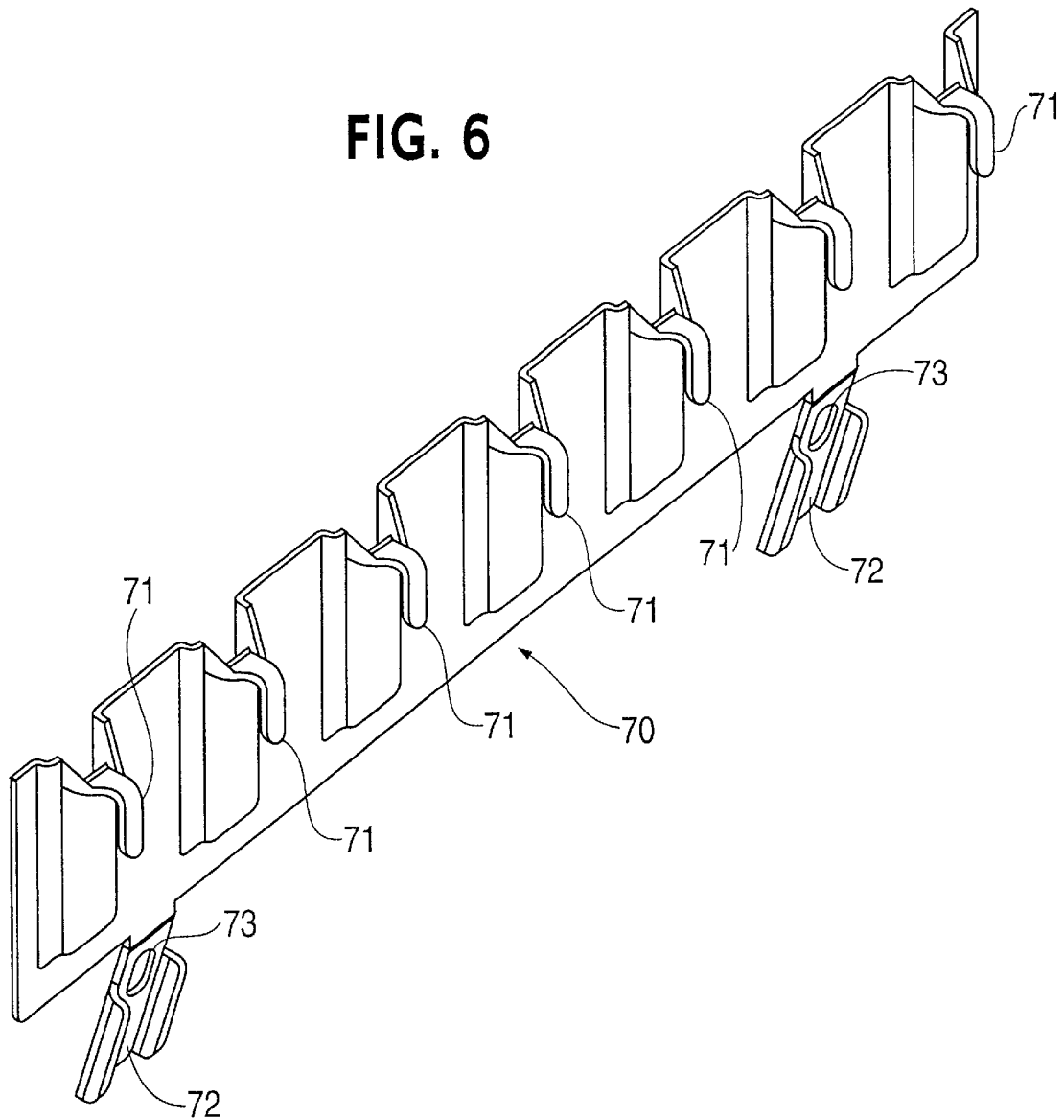
FIG. 6 is a perspective view of a fixing member according to the present invention.

As shown in FIG. 6, the fixing members 70 are provided with hooks 71 which engage with openings 6b formed in the leg portions 6B and 6B and tongue pieces 72 which extend downward. Holes 73 are provided in the tongue pieces 72 for receiving the rivets 8. The belts 7B are fixed to the tongue pieces 72. The belts 7B are not connected to the retainer 1B, and merely surround the inflator 4B at the bottom thereof. In addition, there is some amount of clearance provided between the belts 7B and the inflator 4B. The amount of clearance is enough to allow the lid 3B to move, for positioning itself, in the Z and X directions without being restrained by the retainer 1B.

Figure 7:
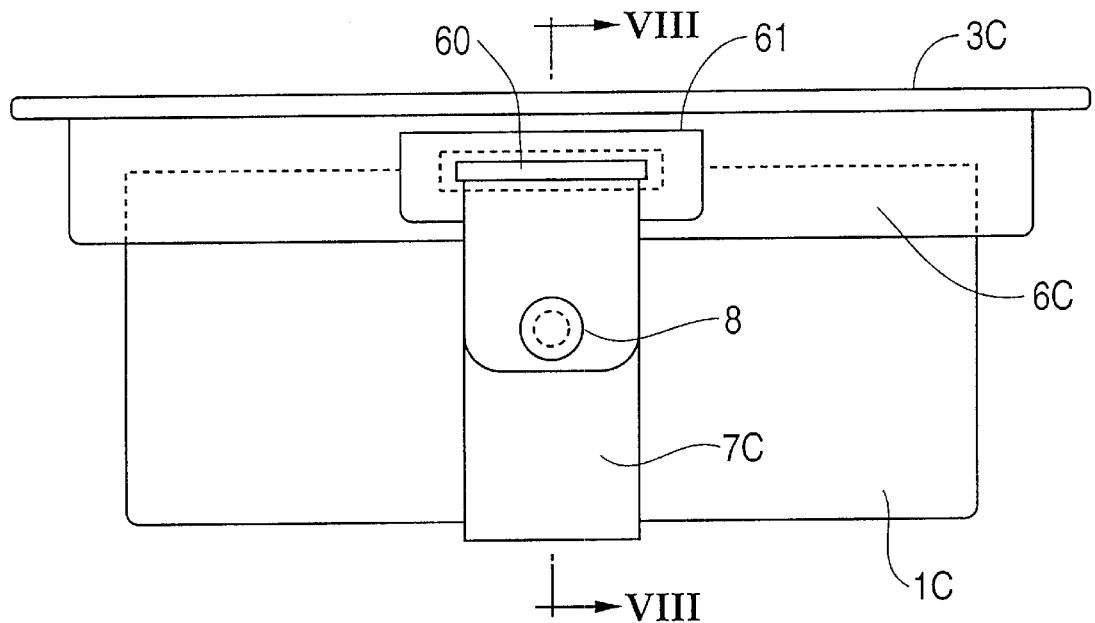
FIG. 7 is a side view of an air bag apparatus according to another embodiment of the present invention.
Figure 8:
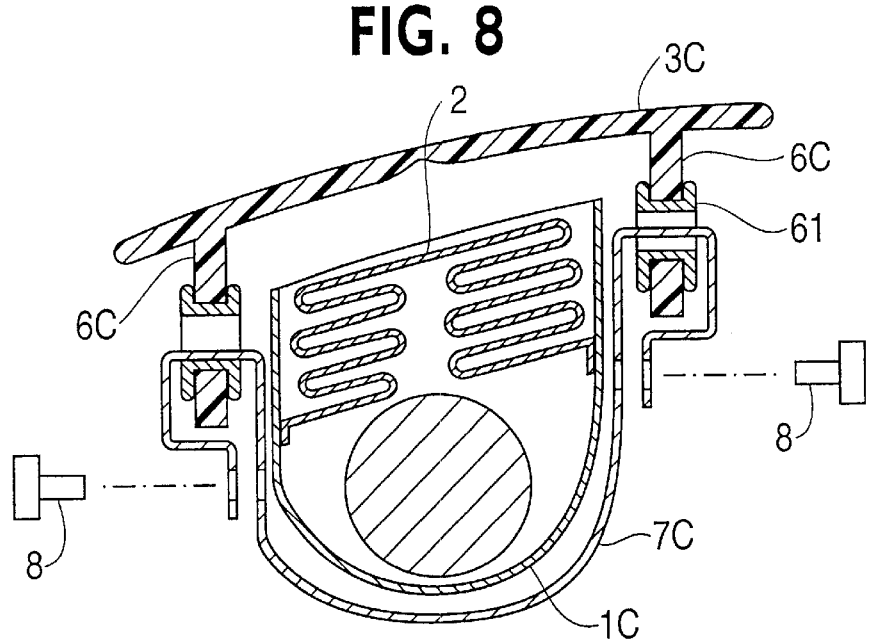
FIG. 8 is a sectional view of the air bag apparatus shown in FIG. 7, which is cut along line VIII—VIII.

A further embodiment of the present invention is shown in FIGS. 7 and 8. The air bag apparatus includes a retainer 1C of which the upper surface (the front surface) is open. An air bag 2 is folded and stored in the retainer 1C. A lid 3C covers the open surface of the retainer 1C. An inflator (gas generator) 4 is provided for expanding the air bag 2. Metal fittings attach the air bag 2 to the retainer 1C. According to the present embodiment, the retainer 1C is longer in the widthwise direction of the vehicle than it is in the longitudinal direction of the vehicle. In addition, the retainer 1C has the shape of an open container. The open surface at the upper side has an approximately rectangular shape.

As shown in FIGS. 7 and 8, the lid 3C is provided with leg portions 6C which project from the bottom surface of the lid 3C. The leg portions 6C are disposed along the external surfaces of the retainer 1C at the upper side, leaving a predetermined clearance therebetween. The leg portions 6C are provided with long holes 60, in which reinforcing members 61 are fitted.

The external surfaces of the retainer 1C are surrounded by a belt 7C. Both ends of the belt 7C are inserted through the long holes 60 formed in the leg portions 6C, and are fixed by rivets 8 or the like.

The reinforcing members 61 prevent fracturing of the leg portions 6C due to shear force when the leg portions 6C receive force. In addition, the reinforcing members 61 also serve to spread out stress as frictional force. The belt 7C is not connected to the retainer 1C, and is merely led around the side surfaces and the bottom surface of the retainer 1C. There is some amount of clearance provided between the belt 7C and the retainer 1C over the entire region of the external surfaces of the retainer 1d. The amount of clearance is enough to allow the lid 3C to move, for positioning itself, in the Z and X directions without being restrained by the retainer 1C.

As shown in the figure, one belt 7C is disposed at the center in the widthwise direction of the vehicle (the Y direction). However, more than one belt 7C may also be provided.

Figure 9:
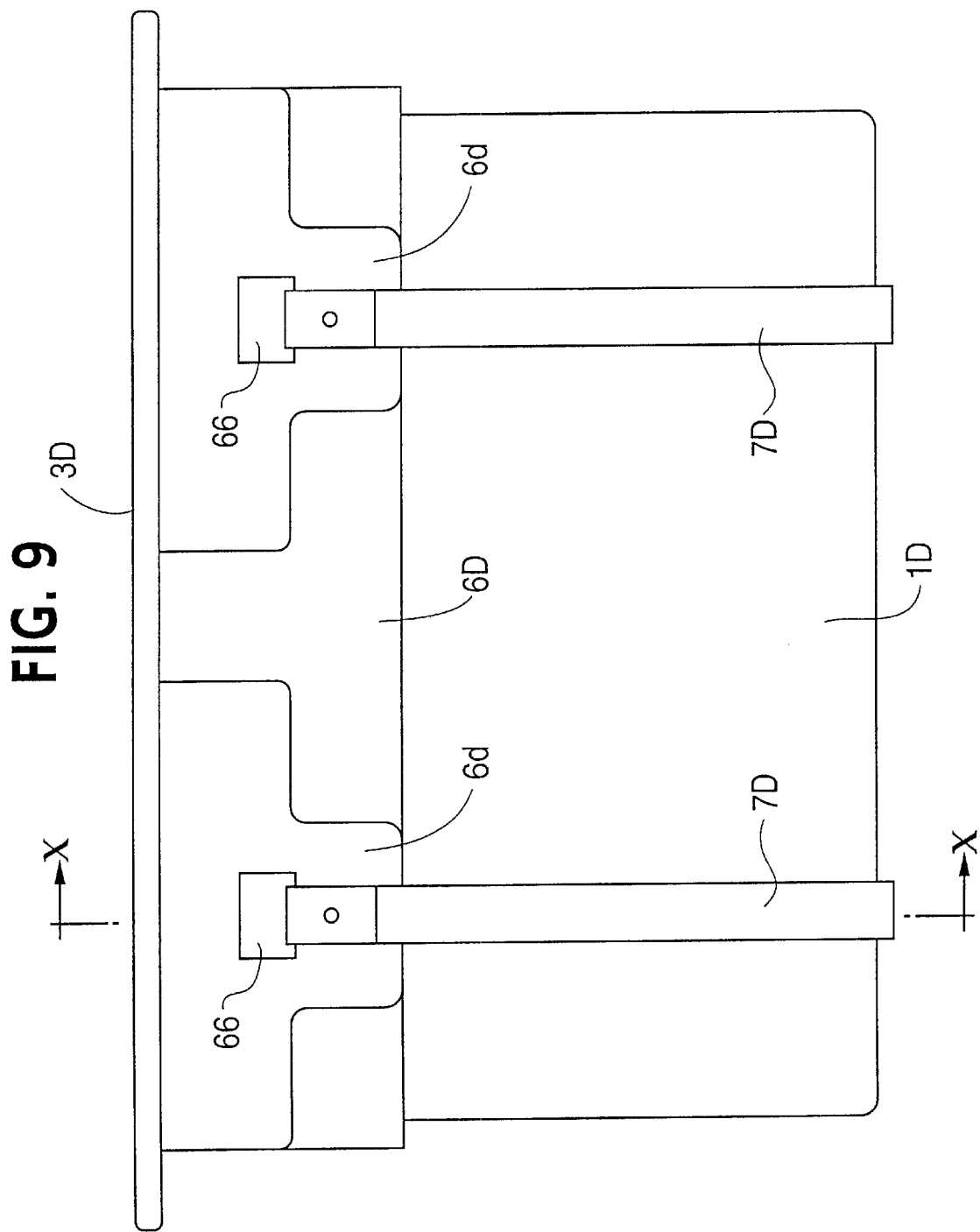
FIG. 9 is a side view of an air bag apparatus according to another embodiment of the present invention.
Figure 10:
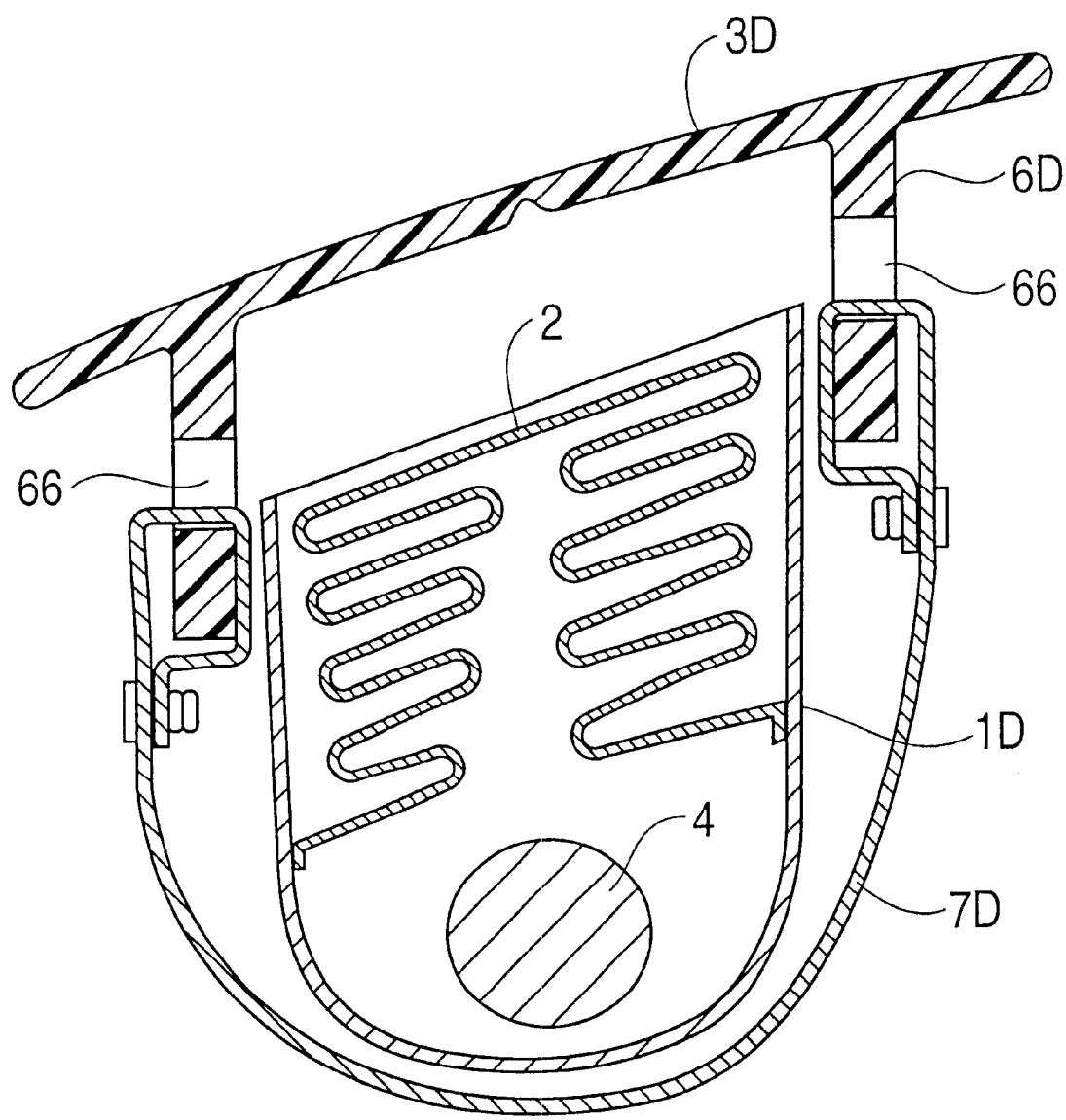
FIG. 10 is a sectional view of the air bag apparatus shown in FIG. 9, which is cut along line X—X.
Figure 11:
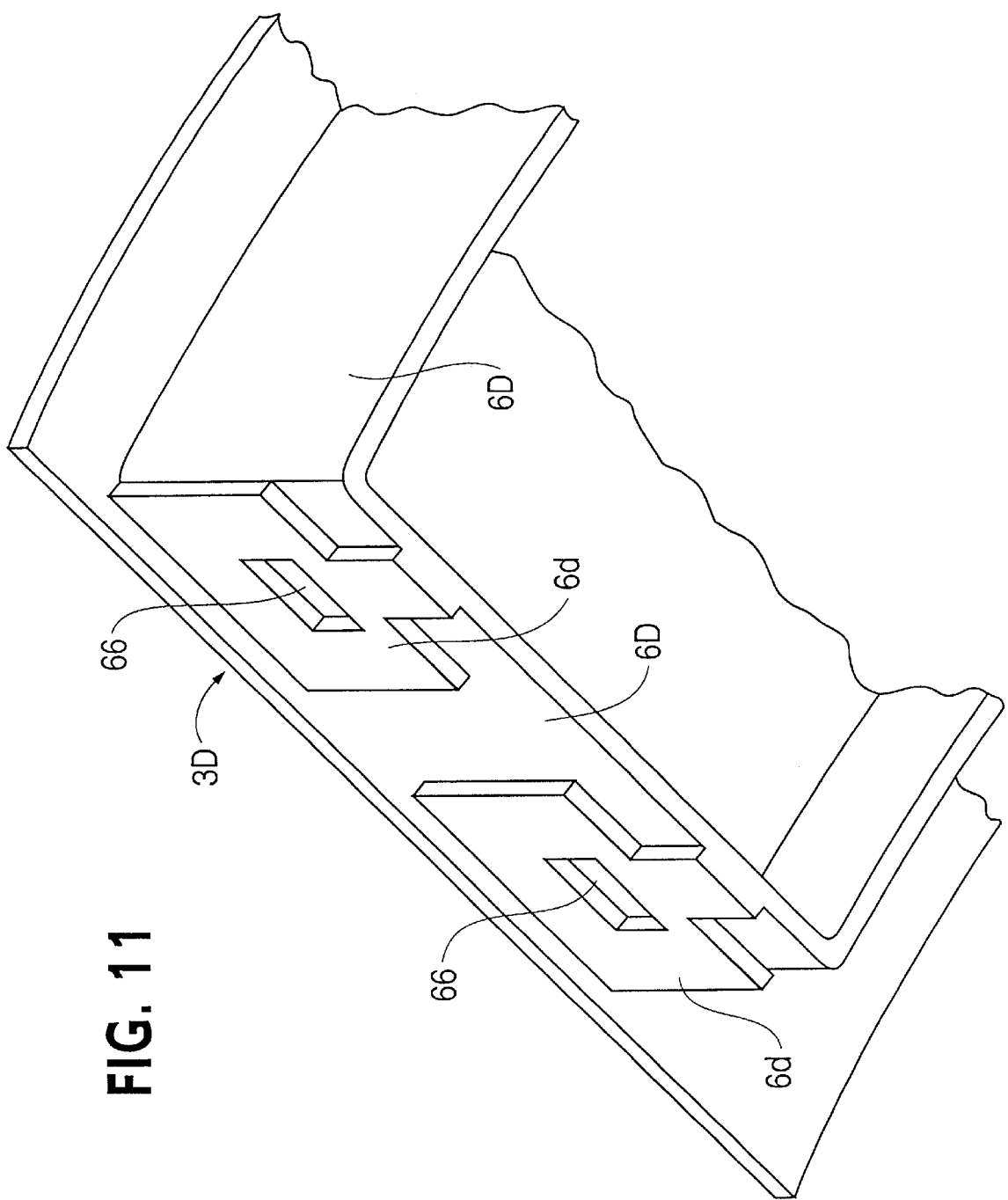
FIG. 11 is a partial perspective view of a lid according to the present invention.

FIGS. 9, 10 and 11 show a further embodiment of the present invention. The air bag apparatus includes a retainer 1D of which the upper surface (the front surface) is open. An air bag 2 is folded and stored in the retainer 1D. A lid 3D covers the open surface of the retainer 1D. An inflator (gas generator) 4 is provident for expanding the air bag 2. Metal fittings attach the air bag 2 to the retainer 1D. According to the present embodiment, the retainer 1D is longer in the widthwise direction of the vehicle, than it is in the longitudinal direction of the vehicle. In addition, the retainer 1D has the shape of an open container. The open surface at the upper side has an approximately rectangular shape.

As shown in FIGS. 10 and 11, the lid 3D is provided with leg portions 6D which project from the bottom surface of the lid 3D. The leg portions 6D are disposed along the external surfaces of the retainer 1D at the upper side, leaving a predetermined clearance therebetween.

The external surfaces of the retainer 1D are surrounded by belts 7D. Both ends of the belts 7D are fixed to the leg portions 6D with rivets 8, bolts, or other fittings.

As shown in FIG. 11, the leg portions 6D are provided with thickened portions 6d, which are thicker than the surrounding regions, at the position where the belts 7D are attached. According to the present embodiment, the thickened portions 6d are disposed to surround holes 66 for receiving the belts 7D so as to increase the strength of the leg portions 6D. In addition, the thickened portions 6d are formed to have the shape of a letter T, so that the shape serves to spread out stress.

The belts 7D are not connected to the retainer 1D, and are merely led around the side surfaces and the bottom surface of the retainer 1D. There is some amount of clearance provided between the belts 7D and the retainer 1D over the entire region of the external surfaces of the retainer 1D. This amount of the clearance is enough to allow the lid 3D to move, for positioning itself, in the Z and X directions without being restrained by the retainer 1D.

Figure 12:
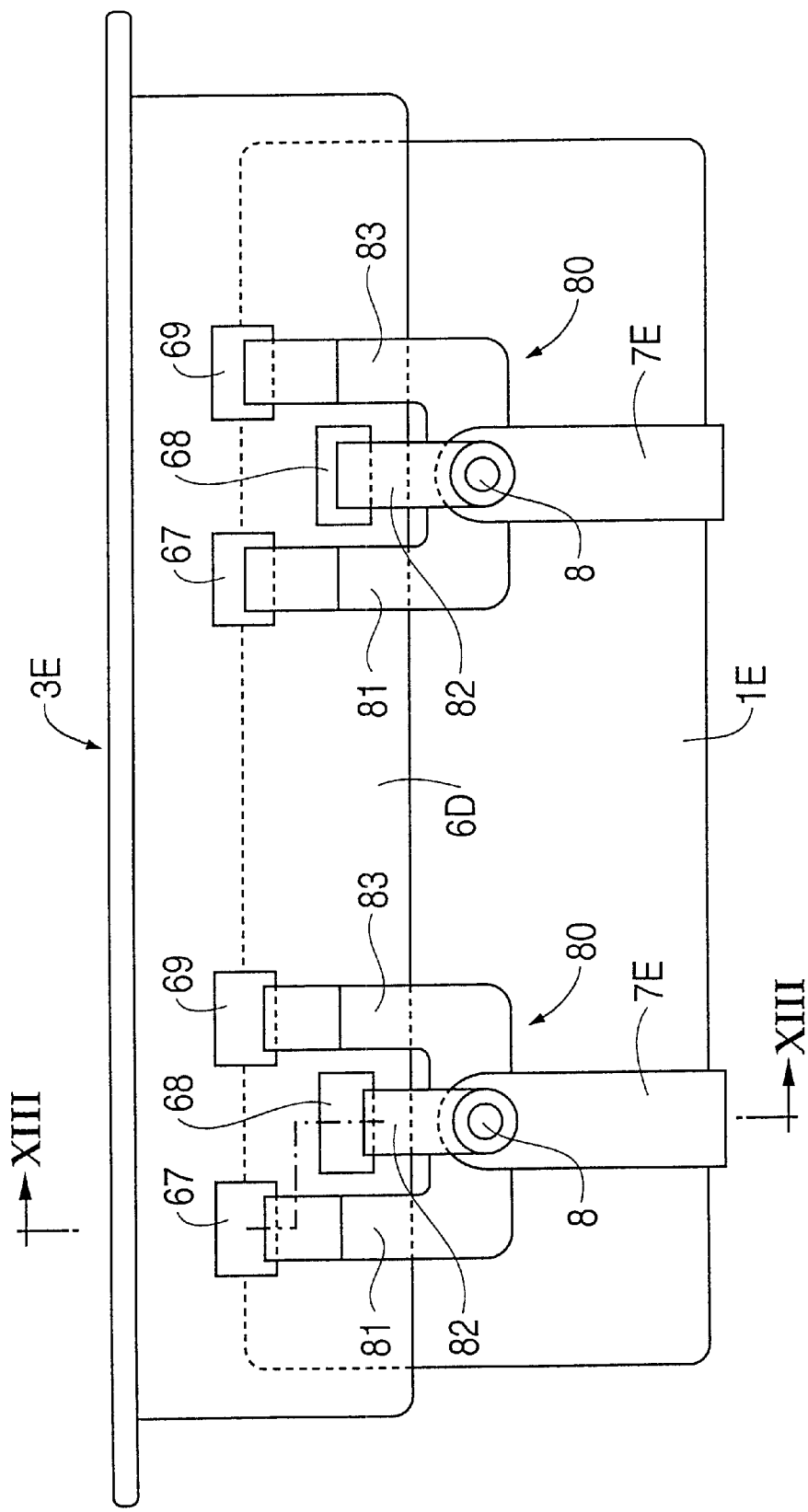
FIG. 12 is a side view of an air bag apparatus according to another embodiment of the present invention.
Figure 13:
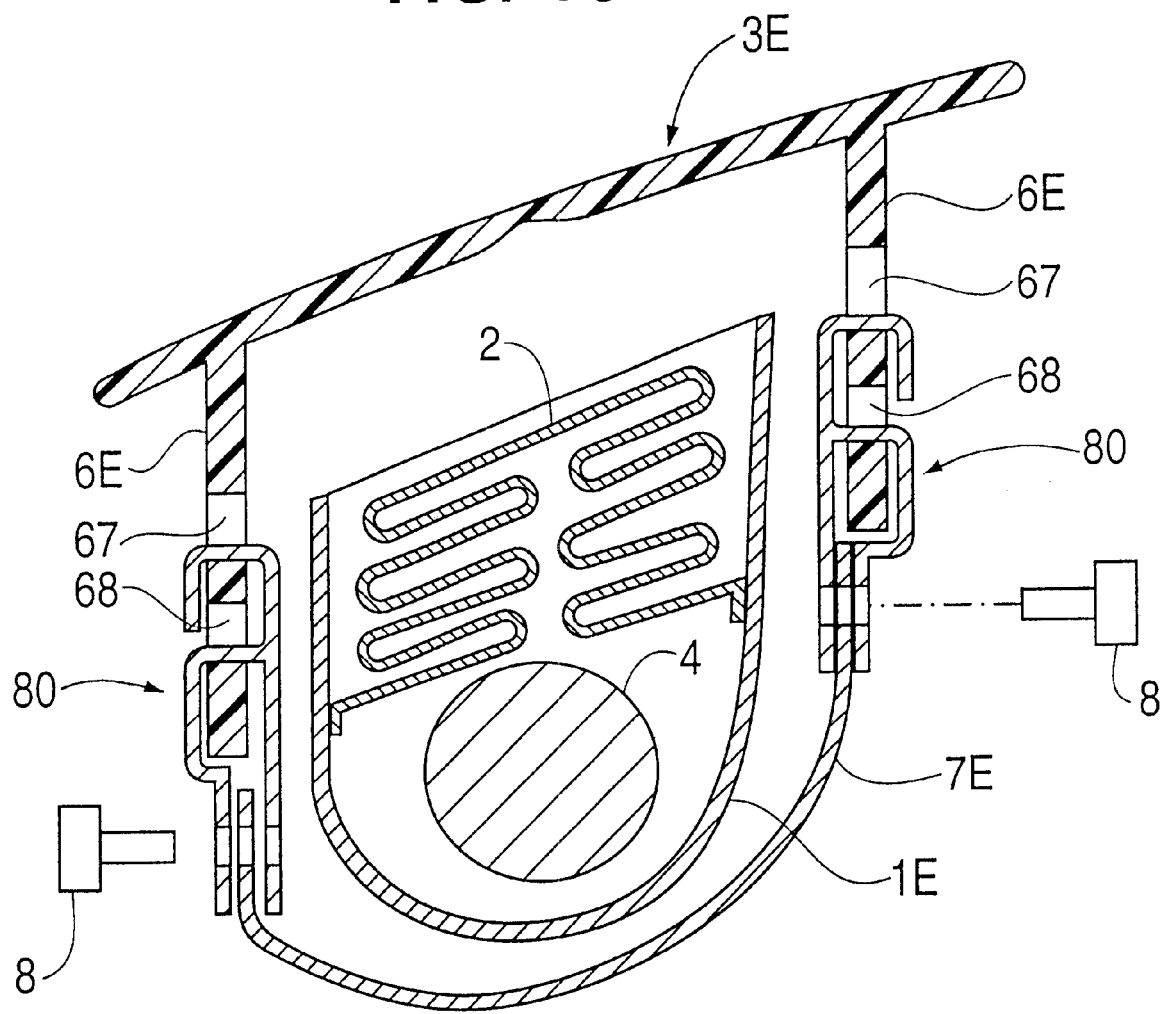
FIG. 13 is a sectional view of the air bag apparatus shown in FIG. 12, which is cut along the line XIII—XIII.
Figure 14:
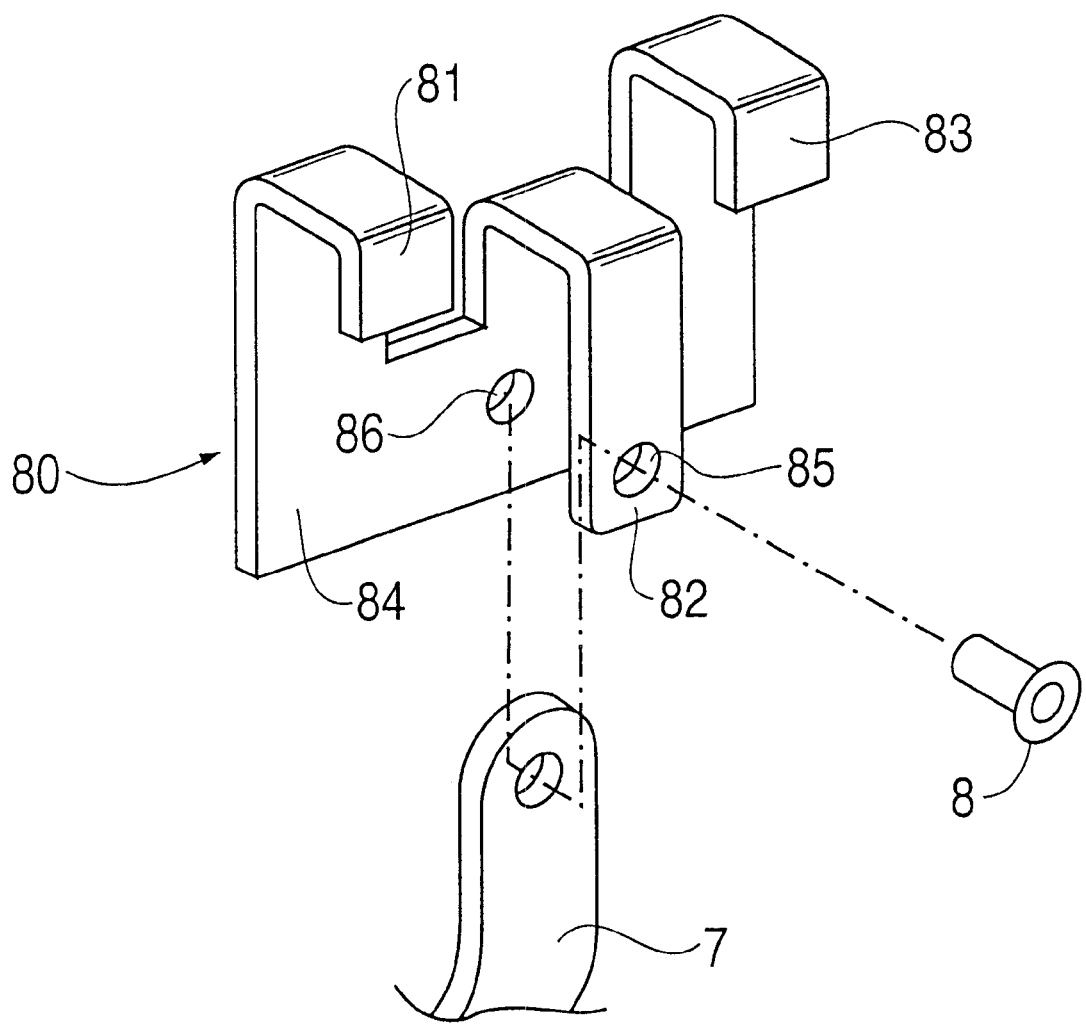
FIG. 14 is a perspective view of a fixing member according to an alternative embodiment of the present invention.

FIGS. 12–14 disclose yet another embodiment of the present invention. The air bag apparatus includes a retainer 1E of which the upper surface (the front surface) is open. An air bag 2 is folded and stored in the retainer 1E. A lid 3E covers the open surface of the retainer 1E. An inflator (gas generator) 4 is provided for expanding the air bag 2. Metal fittings attach the air bag 2 to the retainer 1E. According to the present embodiment, the retainer 1E is longer in the widthwise direction of the vehicle than it is in the longitudinal direction of the vehicle. In addition, the retainer 1E has the shape of an open container. The open surface at the upper side has an approximately rectangular shape.

The lid 3E is provided with leg portions 6E which project from the bottom surface of the lid 3E. The leg portions 6E are disposed along the external surfaces of the retainer 1E at the upper side, leaving a predetermined clearance therebetween. The leg portions 6E are provided with holes 67, 68, and 69, to which fixing members 80 for fixing belts 7E are attached.

The external surfaces of the retainer 1E are surrounded by the belts 7E. Both ends of the belts 7E are fixed to the leg portions 6E by using the fixing members 80 and rivets 8. As shown in FIG. 14, each of the fixing members 80 are provided with three hooks 81, 82, and 83, which are engaged with holes 67, 68, and 69, respectively. The belts 7E are inserted between the hooks 82 and plate portions 84, and are fixed to the fitting members 80 with the rivets 8, which are inserted through holes 85 and 86. The holes 67 and 69 are positioned above the holes 68 so that the stress applied to the leg portions 6E from the belts 7E is spread out.

The belts 7E are not connected to the retainer 1E, but do pass around the side surfaces and the bottom surface of the retainer 1E. There is a clearance provided between the belts 7E and the retainer 1E over the entire region of the external surfaces of the retainer 1E. The amount of clearance is enough to allow the lid 3 to move, for positioning itself, in the Z and X directions without being restrained by the retainer 1E.

Figure 15:
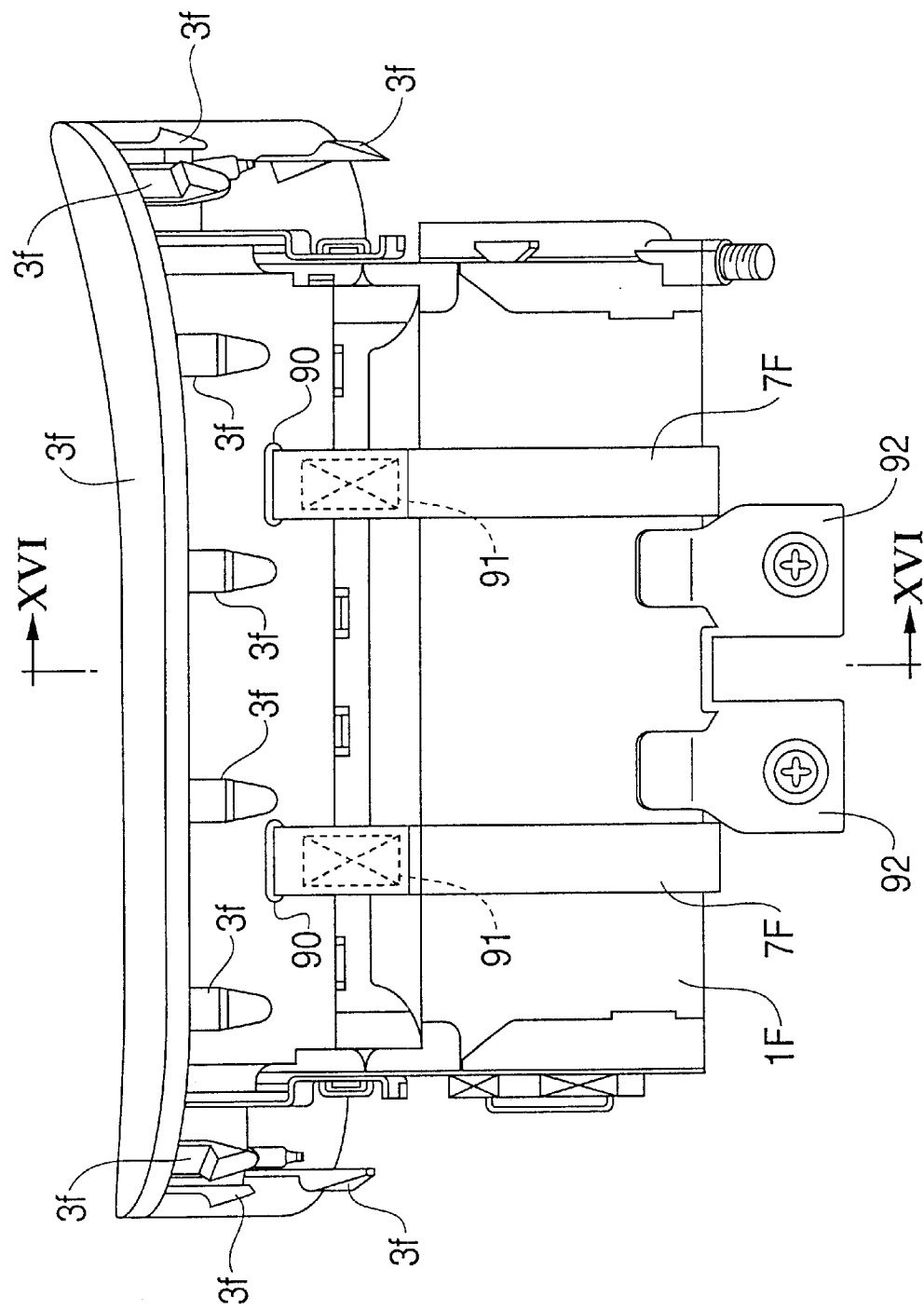
FIG. 15 is a side view of an air bag apparatus according to another embodiment of the present invention.
Figure 16:
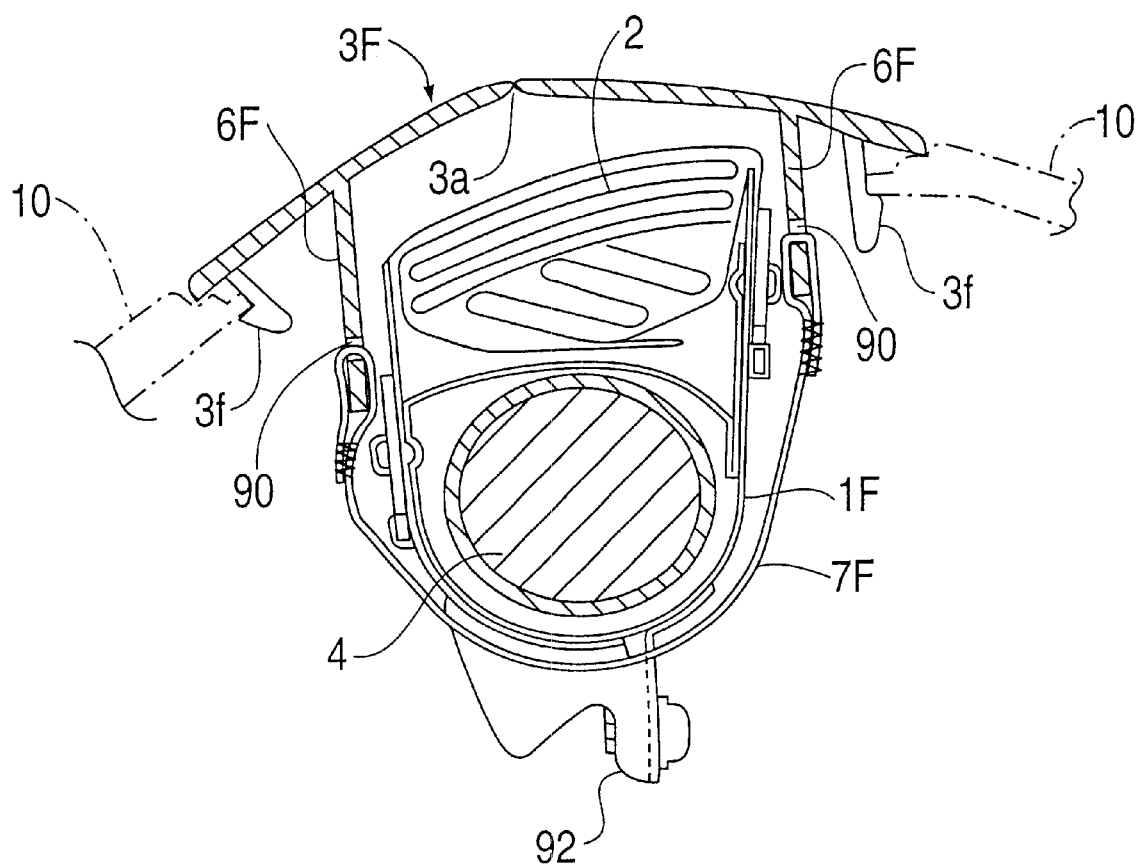
FIG. 16 is a sectional view of the air bag apparatus shown in FIG. 15, which is cut along the line XVI—XVI.

FIGS. 15 and 16 disclose a further embodiment of the present invention. The air bag apparatus includes a retainer 1F of which the upper surface (the front surface) is open. An air bag 2 is folded and stored in the retainer 1F. A lid 3F covers the open surface of the retainer 1F. An inflator (gas generator) 4 is provided for expanding the air bag 2. Metal fittings attach the air bag 2 to the retainer 1F.

According to the present embodiment, the retainer 1F is longer in the widthwise direction of the vehicle than it is in the longitudinal direction of the vehicle. In addition, the retainer 1F has the shape of an open container. The open surface at the upper side has an approximately rectangular shape. The retainer 1F is provided with brackets 92 at the bottom. The brackets 92 are used to attach the retainer 1F to a member of the main body of the vehicle.

The lid 3F is provided with leg portions 6F which project from the bottom surface of the lid 3F. The leg portions 6F are disposed along the external surfaces of the retainer 1F at the upper side, leaving a predetermined clearance therebetween. The leg portions 6F are provided with holes 90 through which end portions of belts 7 are inserted. The end portions of the belts 7 inserted through the holes 90 are folded and sewn, overlapping themselves under the leg portions 6F. The stitching line 91 is shown in FIG. 15.

The belts 7F are not connected to the retainer 1F, but do not pass around the side surfaces and the bottom surface of the retainer 1F. There is a clearance provided between the belts 7F and the retainer 1F over the entire region of the external surfaces of the retainer 1F. The clearance is enough to allow the lid 3F to move, for positioning itself, in the Z and X directions without being restrained by the retainer 1F.

Figure 17:
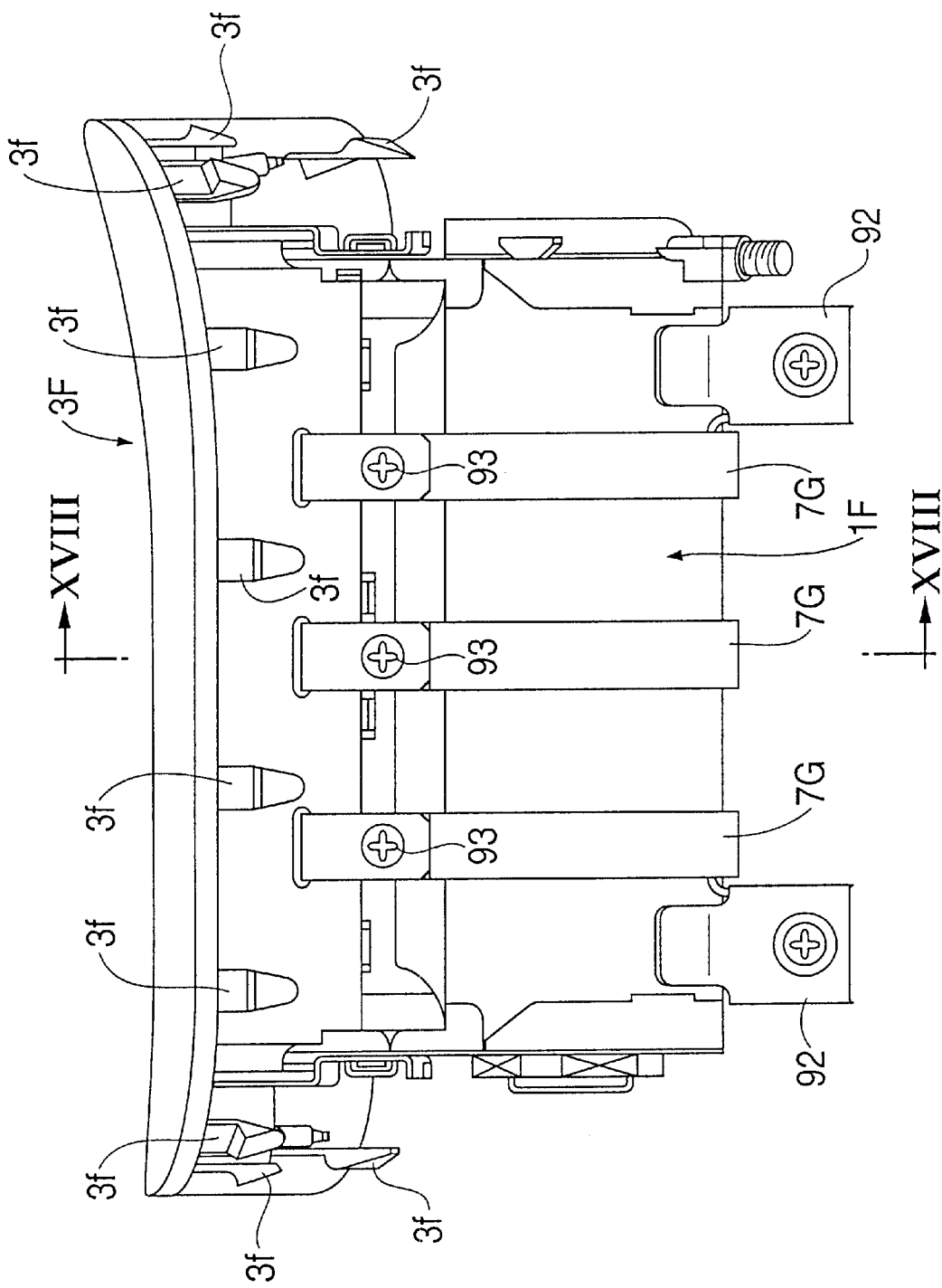
FIG. 17 is a side view of an air bag apparatus according to another embodiment of the present invention.
Figure 18:
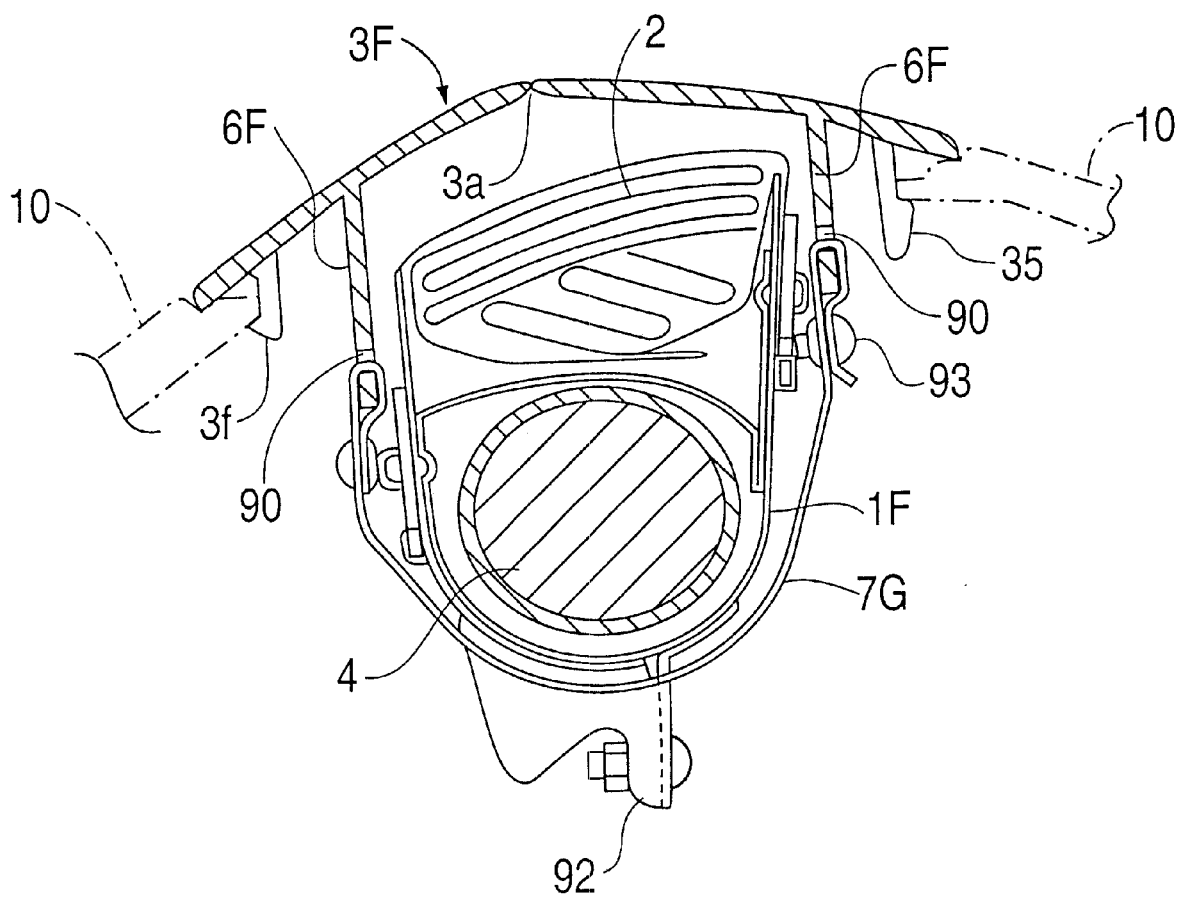
FIG. 18 is a sectional view of the air bag apparatus shown in FIG. 17, which is cut along the line XVIII—XVIII.

The belts 7F are preferably constructed of, for example, woven products made from plastic threads. As for an alternative to the belts 7F constructed of woven products, belts 7G shown in FIGS. 17 and 18 which are constructed of flexible plates such as thin steel belts may be used. In the case of using the flexible plates, rivets 93 or spot welding (not shown) are applied instead of forming the stitching line 91 by sewing.

According to the present invention, the belts described above may be provided with non-woven fabrics or sponges on the surface facing the retainer. Accordingly, even when the belts contact the retainer, unusual noise is prevented.

As described above, in the air bag apparatus of the present invention, the lid is moveable in the vertical, the longitudinal, and the widthwise directions relative to the retainer. Accordingly, the positioning of the lid against the opening for attaching the air bag apparatus is extremely easy. In addition, metal hooks used in the conventional type are excluded, so that a lightweight construction is realized.

We claim:

1. An air bag apparatus comprising:
   a retainer having the shape of an open container;
   an air bag stored inside said retainer, a peripheral portion of said air bag being attached to said retainer around an aperture for receiving a gas;
   a lid positioned in an opening in an instrument panel and covering the open surface of said retainer, said lid being attached to the instrument panel; and
   at least one member having two ends positioned to pass around an external surface of said retainer and being attached to said lid at both ends, and
   wherein said member is not restrained by said retainer so that said lid is movable in three dimensions.

2. The air bag apparatus of claim 1, wherein the instrument panel includes top and bottom surfaces and said lid is attached to said instrument panel by the ends of the members, wherein each end includes extending portions which extend to the bottom surface of the panel adjacent the opening that receives the lid.

3. The air bag apparatus of claim 1, wherein said lid includes a plurality of leg portions which are disposed along the external surfaces of said retainer.

4. The air bag apparatus of claim 3, wherein the instrument panel includes top and bottom surfaces and said lid is attached to said instrument panel by protrusions provided on said leg portions, each of said protrusions contacting the bottom surface of the panel adjacent the opening that receives the lid.

5. The air bag apparatus of claim 1, wherein a clearance is provided between each of said at least one member and said retainer over the entire external surface of said retainer passed over by said member.

6. The air bag apparatus of claim 1, wherein each of said at least one member is a belt.

7. The air bag apparatus of claim 6, wherein each of said at least one belt is attached to said lid by a pair of fixing members.

8. The air bag apparatus of claim 6, wherein said lid includes reinforcement at a location where the belt is attached.

9. The air bag apparatus of claim 6, wherein said belt comprises non-woven fabric on a surface facing said retainer.

10. The air bag apparatus of claim 6, wherein said belt comprises sponge material on a surface facing said retainer.

11. An air bag apparatus comprising:
a retainer having the shape of a container having an opening;
an air bag stored inside said retainer, a peripheral portion of said air bag being attached to said retainer around an aperture for receiving a gas;
a lid positioned in an opening in an instrument panel and covering the opening of said retainer, said lid being resiliently clamped to the instrument panel; and
at least one member having two ends positioned to pass around an external surface of said retainer and being attached to said lid at both ends, and
wherein said member is not restrained by said retainer so that said lid is movable in three dimensions.

12. The apparatus of claim 11, wherein each end of the at least one member is bent so that a curved surface contacts one side of the instrument panel with the lid contacting the opposite side of the instrument panel.

13. An air bag apparatus comprising:
a retainer having the shape of a container having an opening;
an air bag stored inside said retainer, a peripheral portion of said air bag being attached to said retainer around an aperture for receiving a gas;
an inflator for providing gas to the air bag;
a lid positioned in an opening in an instrument panel and covering the opening of said retainer, said lid being attached to the instrument panel; and
at least one member having two ends positioned to pass unrestrained around an external surface of said inflator without being fixed to said retainer and being attached to said lid at both ends.

14. An air bag apparatus comprising:
a retainer having the shape of a container having an opening;
an air bag stored inside said retainer, a peripheral portion of said air bag being attached to said retainer around an aperture for receiving a gas;
a lid positioned in an opening in an instrument panel and covering the opening of said retainer, said lid being attached to the instrument panel; and
at least one member having two ends positioned to pass unrestrained around an external surface of said retainer without being fixed to said retainer and being attached to said lid at both ends.

15. The apparatus of claim 14, wherein each end of the at least one member passes through openings in the lid.

16. The air bag apparatus of claim 14, wherein each end of the member is attached to the lid at a plurality of locations.

17. The air bag apparatus of claim 14, further comprising a pair of fixing members, each fixing member being attached to one of the two ends of the member and attached to the lid at the plurality of locations.

18. The air bag apparatus of claim 17, wherein the fixing member includes a plurality of hooks attached to the lid.

19. The air bag apparatus of claim 18, wherein two of the plurality of hooks attach to the lid above another of one of the hooks so that stress applied to the lid by the at least one member is distributed to different portions of the lid.

20. An air bag apparatus comprising:
a retainer having the shape of a container having an opening;
an air bag stored inside said retainer, a peripheral portion of said air bag being attached to said retainer around an aperture for receiving a gas;
a lid positioned in an opening in an instrument panel and covering the opening of said retainer, said lid being attached to the instrument panel; and
at least one member having two ends positioned to pass around an external surface of said retainer without being fixed to said retainer and being attached to said lid at both ends; and
wherein the lid includes thickened portions at the location where the at least one member is attached to the lid.

21. The apparatus of claim 20, wherein each end of the at least one member passes through an opening in the lid.

22. The apparatus of claim 21, wherein the thickened portions surround the openings.

23. The apparatus of claim 22, wherein each thickened portion is T-shaped.

24. The apparatus of claim 21, wherein after passing through the opening, each end of the at least one member is connected to another portion of the at least one member.

25. The apparatus of claim 20, wherein the at least one member comprises a thin steel belt.

* * * * *